(12) United States Patent
Minkin et al.

(10) Patent No.: US 7,289,126 B1
(45) Date of Patent: Oct. 30, 2007

(54) GAMMA-CORRECTED TEXEL STORAGE IN A GRAPHICS MEMORY

(75) Inventors: Alexander L. Minkin, Los Altos, CA (US); Harold Robert Feldman Zable, Palo Alto, CA (US); Matthew N. Papakipos, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 214 days.

(21) Appl. No.: 10/445,144

(22) Filed: May 23, 2003

(51) Int. Cl.
*G09G 5/00* (2006.01)
*G06T 15/50* (2006.01)
*G06T 15/00* (2006.01)

(52) U.S. Cl. ............... 345/582; 345/426; 345/418

(58) Field of Classification Search ........ 345/582, 345/418, 589, 545, 552, 556, 530, 581, 501; 348/441; 382/260, 254
See application file for complete search history.

(56) References Cited

U.S. PATENT DOCUMENTS

| | | | | |
|---|---|---|---|---|
| 4,989,091 A * | 1/1991 | Lucas | ............... | 348/458 |
| 5,012,163 A * | 4/1991 | Alcorn et al. | ............... | 315/383 |
| 5,519,823 A * | 5/1996 | Barkans | ............... | 345/443 |
| 6,104,415 A * | 8/2000 | Gossett | ............... | 345/552 |
| 6,593,925 B1 * | 7/2003 | Hakura et al. | ............... | 345/426 |
| 6,738,526 B1 * | 5/2004 | Betrisey et al. | ............... | 382/260 |
| 2003/0058247 A1 * | 3/2003 | Naegle | ............... | 345/501 |
| 2003/0142101 A1 * | 7/2003 | Lavelle et al. | ............... | 345/537 |
| 2004/0066386 A1 * | 4/2004 | Leprevost | ............... | 345/582 |
| 2004/0104917 A1 * | 6/2004 | Platt et al. | ............... | 345/589 |

OTHER PUBLICATIONS

Volpe, M. "What's a Driver?". 1999. Mister Driver. http://www.mrdriver.com.*
"Lookup table". Wikimedia Foundation. http://www.fact-index.com/l/lo/lookup_table.html.*
"Gamma Correction Explained". CGSD Corporation. http://www.cgsd.ccom/papers/gamma_intro.html.*
Hammmersley, T. "Bilinear Interpolation of Texture Maps". Oct. 19, 1999. http://www.gamdev.net/reference/articles/article810.asp.*
"Gamma Correction Explained". CGSD Corporation. http://www.cgsd.com/papers/gamma_intro.html.*
Hammersley, T. "Bilinear Interpolation of Texture Maps". Oct. 19, 1999. http://www.gamedev.net/reference/articles/article810.asp.*
"Lookup table," http://en.wikipedia.org/wiki/Lookup_table.*

* cited by examiner

*Primary Examiner*—Ulka Chauhan
*Assistant Examiner*—Joni Hsu
(74) *Attorney, Agent, or Firm*—Townsend and Townsend and Crew LLP (57) ABSTRACT

Methods, circuits, and apparatus for handling gamma-corrected texels stored in a graphics memory. On-the-fly gamma-to-linear and linear-to-gamma conversions are performed such that gamma-corrected texels are provided to circuits that are able to process them, while linear valued texels are supplied where needed. In various embodiments, these conversions are done by lookup tables, software instructions, or dedicated hardware. Gamma-corrected texels may be tracked by a shader program, pipeline states, or driver instructions, and may be identified by header or flag information, or by part of a texture descriptor.

32 Claims, 8 Drawing Sheets

| | 510 | 520 |
|---|---|---|
| | GAMMA | LINEAR |
| 530 → | ENTRY1(G) | ENTRY1(L) |
| | ENTRY2(G) | ENTRY2(L) |
| | ⋮ | ⋮ |
| | ENTRYN(G) | ENTRYN(L) |

500

FIG. 5A $R_0 = R_0 \wedge 1/2.2$ — 540

GAMMA-CORRECTED TEXEL STORAGE IN A GRAPHICS MEMORY

BACKGROUND

The present invention relates to gamma-corrected texels in graphics systems, and particularly to the storage of gamma-corrected texels in a graphics memory and their use and conversion in a graphics system.

An image on a cathode-ray tube (CRT) or other type of monitor is generated by voltages that control three separate electron beams or other type of signals, one each for red, green, and blue. The response at the face of the screen, as measured in brightness or luminescence, to these voltages is nonlinear. Generally speaking, the image seen at the face of the screen is darker than what would be achieved by a linear response. Because of this, image information is lost, particularly among its darker portions. This error is typically reduced by a process referred to as gamma correction.

But typical graphics systems process textures, fragments, and other graphic information in linear space, before it has been gamma corrected. For example, the rendering of pixels on three dimensional objects is done in linear space. Gamma correction is typically done only after the pixels are complete, that is after they have been sent from the scanout engine to the CRT or other type of monitor for display.

This means that a great deal of processing is done on the darker portions of an image where resolution is lost during the conversion to a gamma-corrected image. If some or all of the processing in a graphics system could be performed using gamma-corrected information, for example gamma-corrected texels, the resolution at the dark end of the luminescence range could be retained, and image quality would be improved. However, gamma-corrected texels are not available in current graphics systems. Even if they were available and used, distortion would occur if they were applied since gamma-correction is performed at the graphics system output.

Thus, what is needed are improved circuits and methods for processing gamma-corrected texels and storing them in a graphics memory.

SUMMARY

Accordingly, embodiments of the present invention provide methods, circuits, and apparatus for handling gamma-corrected texels stored in a graphics memory. On-the-fly gamma-to-linear and linear-to-gamma conversions are performed such that gamma-corrected texels are provided to circuits that are able to process them, while linear valued texels are supplied where needed. In various embodiments, these conversions are done by lookup tables, software instructions, or dedicated hardware. Gamma-corrected texels may be tracked by a shader program, pipeline states, or driver instructions, and may be identified by header or flag information, or by part of a texture descriptor.

An exemplary embodiment of the present invention provides a method of processing gamma-corrected texels. The method includes storing gamma-corrected texels in a graphics memory, reading the gamma-corrected texels from the graphics memory, converting the gamma-corrected texels to linear texels in a graphics processor, and generating a linear resultant value using the linear texels and a program running in the graphics processor.

A further exemplary embodiment of the present invention provides a method of processing gamma-corrected texels. The method includes storing gamma-corrected texels in a graphics memory, reading the gamma-corrected texels from the graphics memory, filtering the gamma-corrected texels using a texture filter, converting the filtered gamma-corrected texels to linear texels in a graphics processor, and generating a linear resultant value using the linear texels and a program running in the graphics processor.

Another exemplary embodiment of the present invention provides a method of processing gamma-corrected texels. This method includes storing gamma-corrected texels in a graphics memory, reading the gamma-corrected texels from the graphics memory, converting the gamma-corrected texels to linear texels in a graphics processor, filtering the linear texels using a texture filter, and generating a linear resultant value using the filtered linear texels and a program running in the graphics processor.

A better understanding of the nature and advantages of the present invention may be gained with reference to the following detailed description and the accompanying drawings.

DESCRIPTION OF EXEMPLARY EMBODIMENTS

Figure 1A:
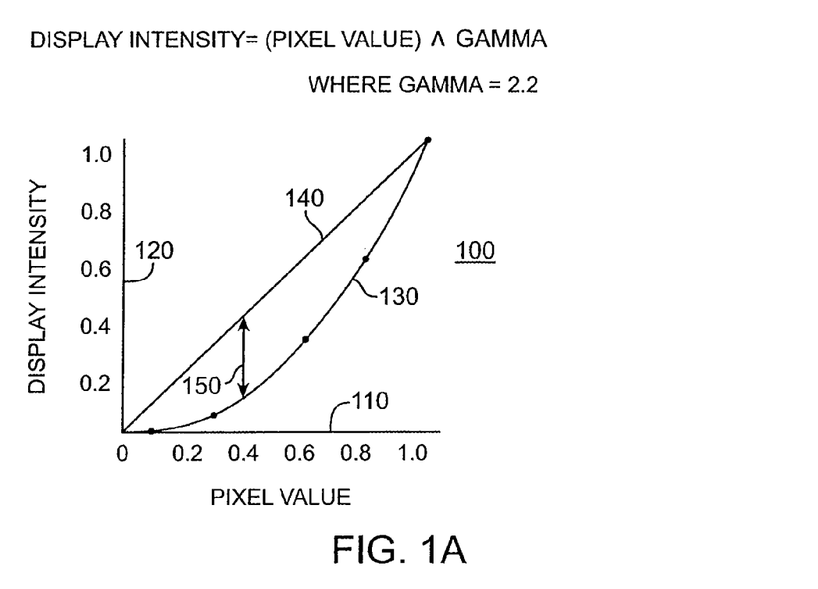
FIG. 1A is a plot illustrating display intensity as a function of pixel value for an exemplary monitor.

FIG. 1A is a plot 100 illustrating display intensity as a function of pixel value for an exemplary monitor, for example a cathode-ray tube (CRT). Display intensity is plotted along a Y-axis 120 as a function of pixel value along X-axis 110. The scales on the X and Y-axes have been normalized to one. Pixel values may, for example, correspond to a voltage level driving a color gun in the CRT. The display intensity is the brightness or luminescence that may be measured at a point on the screen of the monitor The display intensity as a function of pixel value typically follows curve 130 for such a monitor.

As can be seen, curve 130 is below the straight line approximation shown as curve 140, for example by an amount 150. Without correction, this would result in colors on the monitor appearing darker than desired, particularly at low pixel values near zero. This nonlinearity in intensity as a function of pixel value is referred to as gamma. For a typical monitor, curve 130 can be approximated by DISPLAY INTENSITY=(PIXEL VALUE)^GAMMA, where DISPLAY INTENSITY is again the luminescence measured at a pixel on the face of a monitor, PIXEL VALUE is the drive value, for example to a color gun on the monitor, "^" is a symbol meaning "to the power of," and GAMMA is an empirically derived value, typically between 1.7 and 2.7, for example 2.2. While this curve is typical for a cathode-ray tube type monitor, other display devices such as liquid crystal diodes or film printers have similar gamma or color correction curves.

Figure 1B:
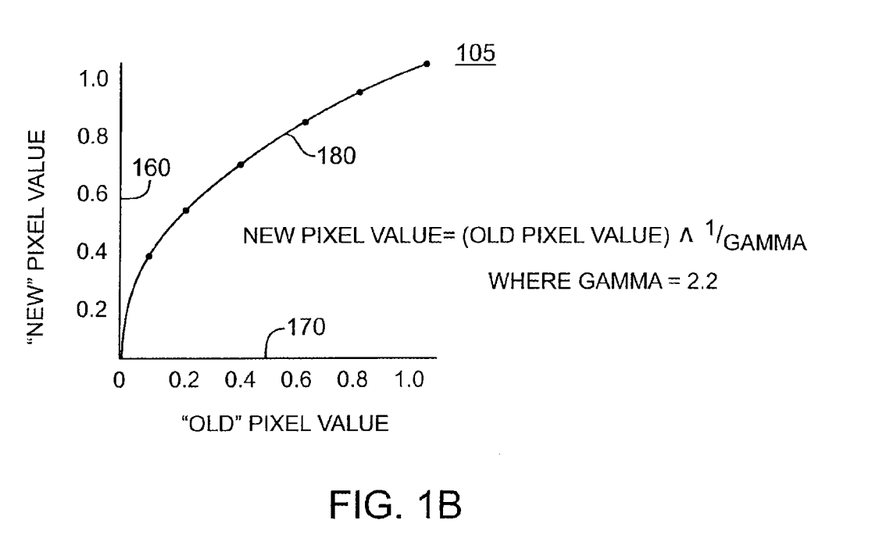
FIG. 1B illustrates the gamma correction of pixel values.

To compensate for this darkness, which appears as a loss of contrast, "old" pixel values may be mapped to into "new" gamma-corrected pixel values before being displayed, as shown by plot 105 in FIG. 1B. This is done by determining a new pixel value using the inverse of the above equation, that is, NEW PIXEL VALUE=(OLD PIXEL VALUE)^1/GAMMA, where NEW PIXEL value is the new gamma-corrected pixel value, OLD PIXEL VALUE is the linear-space pixel value, the same pixel value as in plot 100, and GAMMA is the gamma of the monitor, as above. This equation maps low value pixel levels into new higher value pixel levels, resulting in greater brightness or luminescence.

As a result of this mapping, the corrected display intensity can be found by DISPLAY INTENSITY=(NEW PIXEL VALUE)^GAMMA=OLD PIXEL VALUE, where DISPLAY INTENSITY is the luminescence measured at a pixel at the face of a monitor, NEW PIXEL VALUE is the gamma-corrected value derived above, GAMMA is the gamma of the monitor, and OLD PIXEL VALUE is the original linear-space, non-gamma-corrected pixel value. The graph of this is the curve 140 in FIG. 1A. The result is a linear display intensity as a function of pixel value, resulting in a brighter, gamma-corrected image. If gamma correction is not done, computational resources and accuracy are focused on details of darker regions of the image where those resources have the least visible effect. If the nonlinearity of the monitor is not compensated for, the final image itself appears much darker than it should. Also, since processing occurs at many steps through a graphics pipeline, it is desirable to perform as much of this processing as possible in a gamma-corrected space.

Accordingly, at some point in a graphics system that is generating a signal for the monitor, a gamma correction is typically done. That is, the old, or linear pixel values are mapped into new, or gamma-corrected pixel values before being sent to the monitor.

Figure 2:
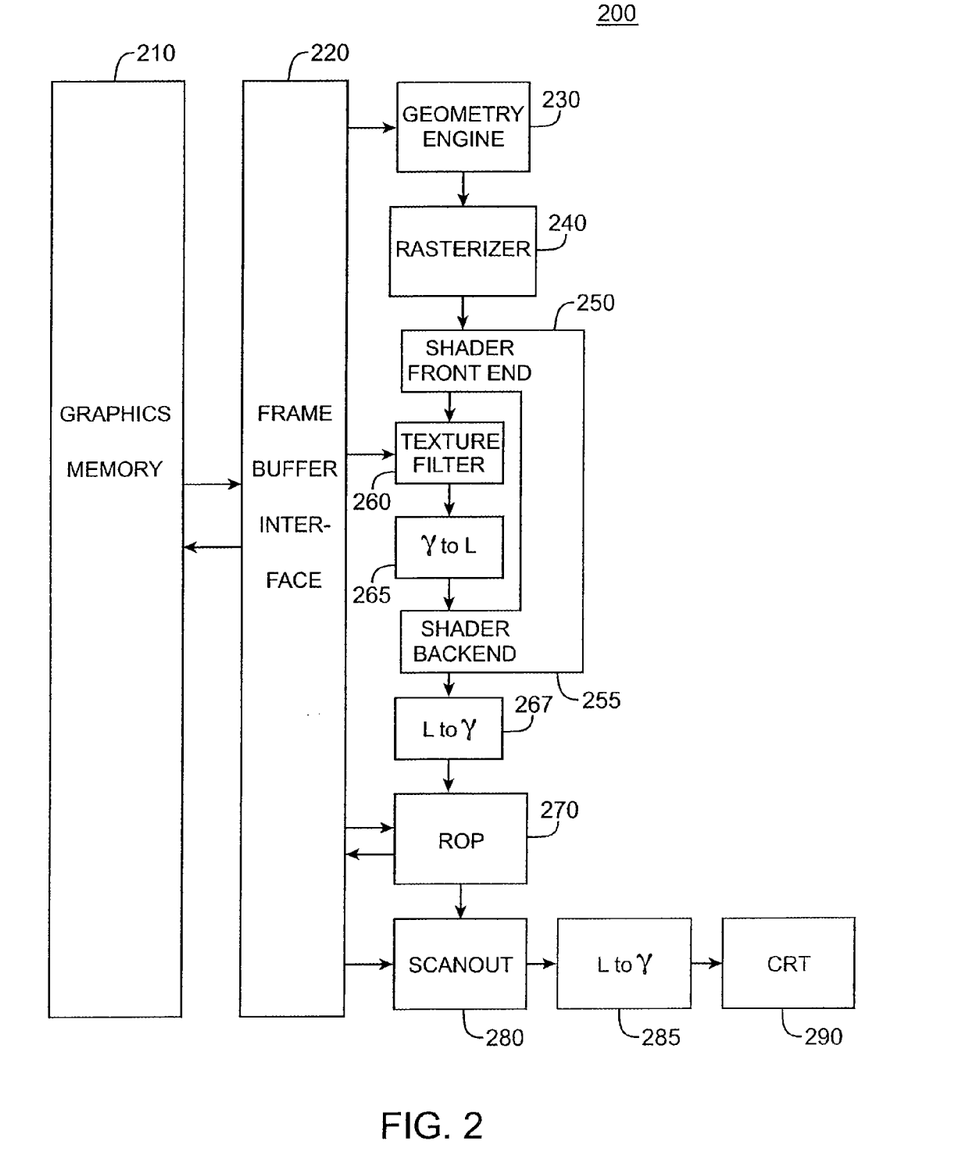
FIG. 2 is a block diagram of a graphics system that is benefited by the incorporation of an exemplary embodiment of the present invention.

FIG. 2 is a block diagram of a graphics systems 200 that is benefited by the incorporation of an exemplary embodiment of the present invention. This figure, as with all the included figures, is shown for illustrative purposes only and does not to limit either the possible embodiments of the present invention or the claims.

Included are a graphics memory 210, frame buffer interface 220, geometry engine 230, rasterizer 240, a shader including front end 250 and back end 255, texture filter 260, gamma-to-linear converter 265, linear-to-gamma converter 267, rasterizer operator (ROP) 270, scanout engine 280, linear-to-gamma converter 285, and monitor 290. The gamma-to-linear converter 265 may alternately be included as part of either the texture filter 260 or shader back end 255. The linear-to-gamma converter 267 can alternately be included as part of the shader back end 255 or ROP 270. In a specific embodiment of the present invention, most of the circuitry, with the exclusion of the graphics memory 210 and CRT 270, are integrated on to a single integrated circuit.

The geometry engine 230 receives geometries from the graphics memory 210 through the frame buffer interface 220. The geometry engine 230 provides these geometries to the rasterizer 240, which provides rasterized geometries to the shader front end 250.

Texels are received by the texture filter 260 from the graphics memory 210 through the frame buffer interface 220. The texture filter provides filtered texels to the gamma-to-linear converter 265. The gamma-to-linear converter 265 provides linearized filtered texels to the shader back end 255.

If the processing of a fragment is not complete, the fragment is passed from the shader back end 255 to the shader front end 250 where it passes through the shader again. If the processing of a fragment is complete, the fragment is output from the shader back end 255 to the linear-to-gamma converter 267. The output of the linear-to-gamma converter 267 is received by the ROP 270, which provides an output to the scanout engine 280.

The scanout engine 280 receives pixels for display from the graphics memory 210 through the frame buffer interface 220, and provides an output to the linear-to-gamma converter 285. The linear-to-gamma converter 285 drives the CRT display 290.

In this embodiment, some or all of the texels stored in graphics memory 210 have gamma-corrected values. These gamma-corrected texels are read from the graphics memory and provided to the texture filter 260 by the frame buffer interface 220.

In this embodiment, the shader operates in the linear space. Accordingly, filtered texels output from the texture filter 260 are converted to linear space by the gamma-to-linear converter 265.

In various embodiments, the ROP and scanout engine may require either gamma-corrected or linear values. If the ROP 270 and scanout engine 280 operate in gamma space, the shaded fragments output from the shader back end 255 are gamma corrected by linear-to-gamma converter 267. The ROP 270 and scanout engine 280 can then perform their operations in gamma space. In this case, the linear-to-gamma converter 285 is not needed and is bypassed. Also, in this example, gamma-corrected operations results may be written to and from the graphics memory, for example by the ROP 270.

On the other hand, if the ROP 270 and scanout engine 280 operate in linear space, the linear-to-gamma converter 267 is bypassed. The ROP 270 and scanout engine 280 can then perform their operations in linear space, and the output of the scan out engine is gamma-corrected by the linear-to-gamma converter 285, which in turn drives the CRT 290.

In this way, gamma-corrected texels are stored in the graphics memory 210, and those circuits which can operate on gamma-corrected values do so, while linear values are provided to circuits that require them. Specifically, the texture filter 260 filters gamma-corrected texels, the shader performs its operations in linear space, while in some embodiments the ROP 270 and scanout engine 270 handle gamma-corrected values. Again, this allows for processing of information in gamma-corrected space wherever possible, thus improving image quality, particularly for darker image portions.

In this and other embodiments, the conversion between gamma-corrected and linear and linear-to-gamma-corrected is done on the fly. This means that the latest texels are used and memory is saved since converted linear texels are not stored.

Memory is also saved because gamma correction allocates more of the pixel count range to lighter areas of the image. Referring to FIG. 1A, it can be seen that at the "light" end of the range, where the display intensity is near one, the same change in pixel value leads to a larger change in display intensity in curve 130 than is does in curve 140. This means that for lighter image portions, a one bit change in pixel count results in a greater change in intensity before gamma correction. Accordingly, before gamma correction, more pixel value resolution is needed to properly resolve display intensity. After gamma correction, the pixel value resolution can be reduced. Thus, gamma-corrected texels can be stored at a lower precision and converted to a higher precision in linear space for processing by the shader. In a specific embodiment of the present invention, gamma-corrected texels are stored at 8-bits of resolution in a graphics memory, and converted to 16 bits for the shader, which operates in a linear space. In this specific embodiment, 16-bit linear data is reconverted to 8-bit gamma-corrected data by modifying 16-bit linear data to a 12-bit intermediate linear value before reconverting it to an 8-bit gamma-corrected result. In other embodiments of the present invention, these conversions may use a different number of bits.

Figure 3:
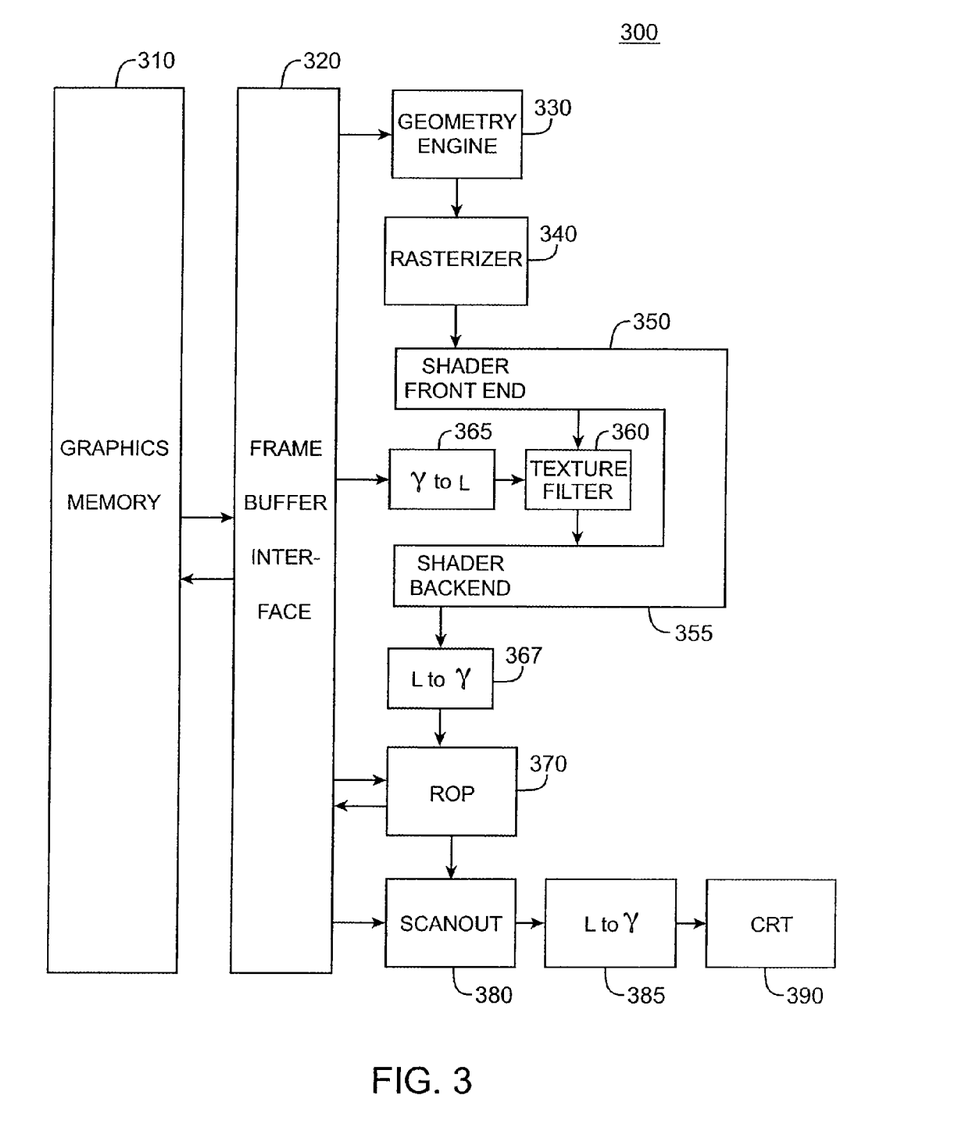
FIG. 3 is a block diagram of another graphics system that is benefited by the incorporation of an exemplary embodiment of the present invention.

FIG. 3 is a block diagram of another graphics system 300 that is benefited by the incorporation of an exemplary embodiment of the present invention. Included are a graphics memory 310, frame buffer interface 320, geometry engine 330, rasterizer 340, a shader including front end 350 and back end 355, texture filter 360, gamma-to-linear converter 365, linear-to-gamma converter 367, rasterizer operator (ROP) 370, scanout engine 380, linear-to-gamma converter 385, and monitor 390. The linear-to-gamma converter 367 can alternately be included in the shader back end 355 or ROP 370, while the gamma-to-linear converter 365 may be included as part of the texture filter 360. Again, in a specific embodiment of the present invention, most of the circuitry, with the exclusion of the graphics memory 310 and CRT 370, are integrated on to a single integrated circuit.

In this embodiment the texture filter 360 and shader operate in linear space. Accordingly, gamma-corrected texels received from the graphics memory 310 through the frame buffer interface 320 are converted to linear space by gamma-to-linear converter 365 before being sent to the texture filter 360. Texture filter 360 then operates on linear texels.

Again, in various embodiments, the ROP and scanout engine may require either gamma-corrected or linear values. If the ROP 370 and scanout engine 380 operate in gamma space, the shaded fragments output from the shader back end 355 are gamma corrected by linear-to-gamma converter 367. As before, the ROP 370 and scanout engine 380 then perform their operations in gamma space, while the linear-to-gamma converter 385 is not needed and is bypassed.

On the other hand, if the ROP 370 and scanout engine 380 operate in linear space, the linear-to-gamma converter 367 is bypassed. The ROP 370 and scanout engine 380 then perform their operations in linear space, and the output of the scan out engine is gamma-corrected by the linear-to-gamma converter 385, which in turn drives the CRT 390.

As before, this architecture allows the texels in graphics memory 310 to be stored having gamma-corrected values. Again, this allows the use of gamma-corrected values where possible, while providing linear values to circuits that operate in that space. Specifically, the texture filter and shader see linear data, while in some embodiments the ROP 370 and scanout engine 380 operate on gamma-corrected values.

Figure 4:
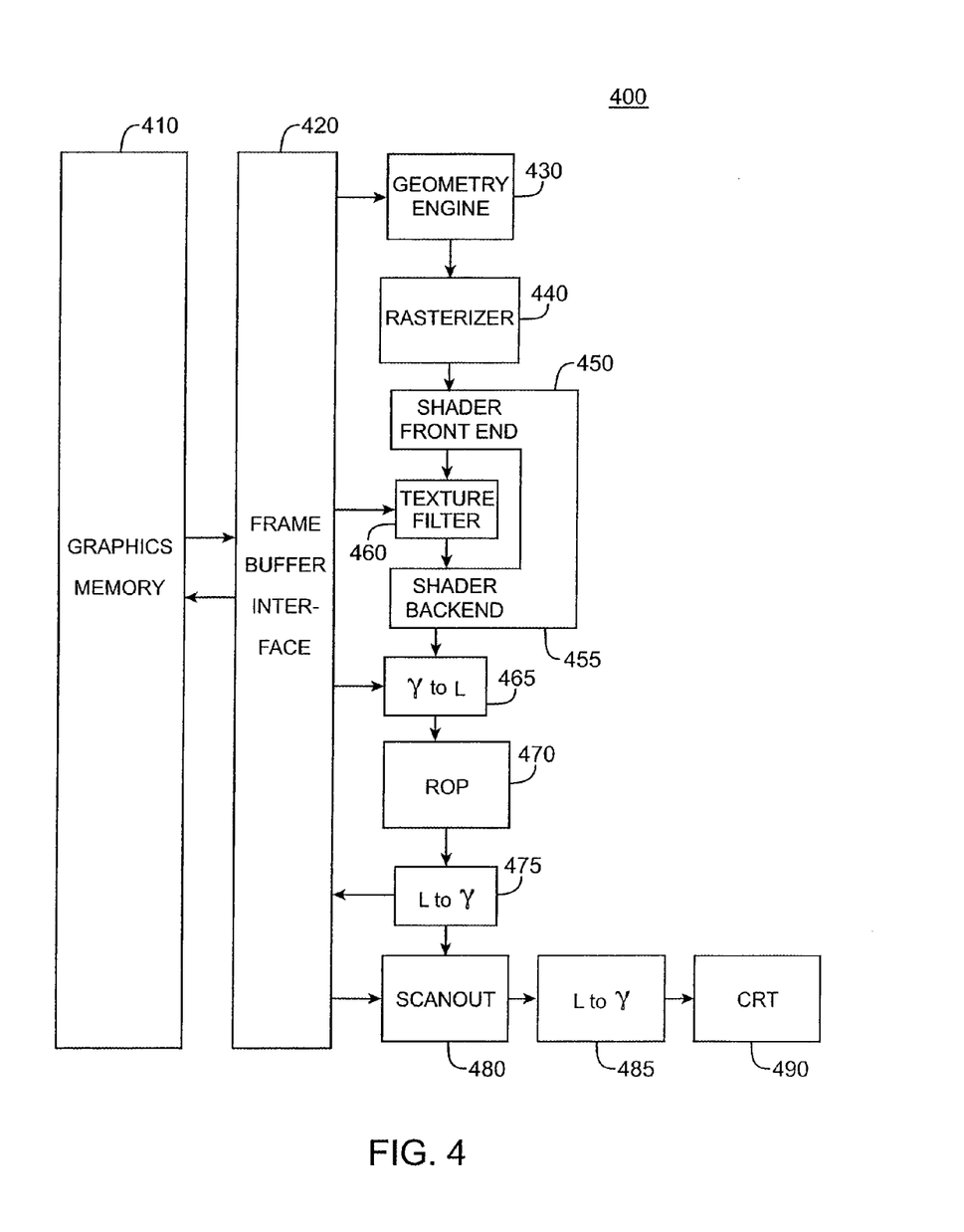
FIG. 4 is a block diagram of another graphics system that is benefited by the incorporation of an exemplary embodiment of the present invention.

FIG. 4 is a block diagram of another graphics system 400 that is benefited by the incorporation of an exemplary embodiment of the present invention. Included are a graphics memory 410, frame buffer interface 420, geometry engine 430, rasterizer 440, a shader including front end 450 and back end 455, texture filter 460, gamma-to-linear converter 465, rasterizer operator (ROP) 470, linear-to-gamma converter 475, scanout engine 480, linear-to-gamma converter 485, and monitor 490. The gamma-to-linear converter 465 may alternately be part of the shader back end 455 or ROP 470, while the linear-to-gamma converter 475 may be part of the ROP 470 or scanout engine 480. As before, in a specific embodiment of the present invention, most of the circuitry, with the exclusion of the graphics memory 410 and CRT 470, are integrated on to a single integrated circuit.

In this embodiment, the texture filter 460 and shader operate in gamma-corrected space. Accordingly, gamma-corrected texels received from the graphics memory 410 through the frame buffer interface 420 are filtered by texture filter 460 and output to the shader back end 455. If the processing of a fragment is not complete, the shader back end 455 passes the fragment to the shader front end 454 for further processing. If the fragment processing is complete, the fragment is output from the shader back end 455 to the gamma-to-linear converter 465.

In some embodiments, the ROP 470 operates on linear fragments. In that case, fragments from the shader back end 455 are converted by the gamma-to-linear converter 465. Also, in some embodiments, the scan out engine 480 operates in gamma-corrected space, thus the output of the ROP 470 is converted by the linear-to-gamma converter 475. In that case, the linear-to-gamma converter 485 may be bypassed, disabled, or omitted.

As before, this architecture allows the texels in graphics memory 410 to be stored having gamma-corrected values. Again, this allows the use of gamma-corrected values where possible, while providing linear values to circuits that operate in that space. Specifically, the texture filter and shader see gamma-corrected data, while in some embodiments the ROP 470 and scanout engine 480 operate on gamma-corrected values.

In various embodiments, the gamma-to-linear and linear-to-gamma converters may be implemented in one or more of several different ways. Also, in various specific embodiments, one or more of these converters may be omitted. Additionally, each converter may include circuitry for bypassing or disabling the converter functions.

Figure 5A:
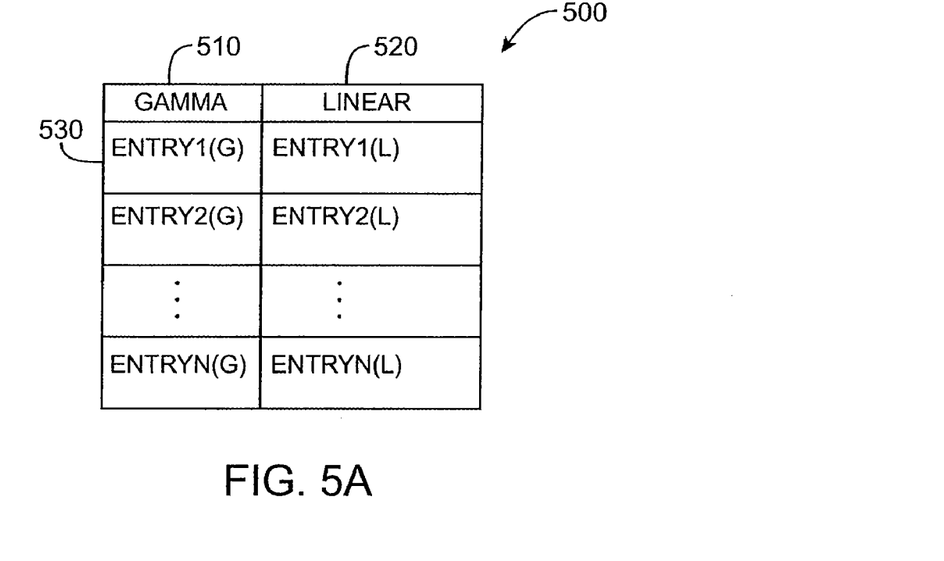
FIG. 5A illustrates a lookup table that may be used as one or more gamma-to-linear and linear-to-gamma converters.

FIG. 5A illustrates a lookup table 500 that may be used as one or more of the gamma-to-linear and linear-to-gamma converters in various embodiments of the present invention. This lookup table may be used to convert gamma-corrected entries 510 to linear outputs 520, linear entries 510 to gamma-corrected outputs 510, or both. Each gamma-corrected value 530 corresponds to a linear value entry, and vice versa.

Figure 5B:
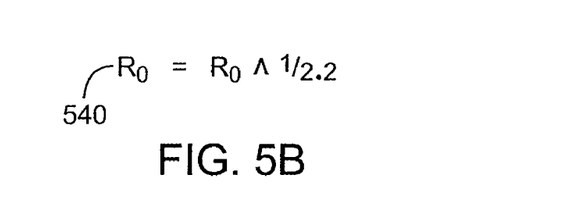
FIG. 5B is a representative line of code that may be used to convert gamma-corrected values to linear values.

Alternately, the conversion may be done in software. FIG. 5B is a representative line of code 540 that may be used to convert gamma-corrected values to linear values consistent with an embodiment of the present invention. Similarly, linear values may be gamma corrected using the inverse of this function.

Figure 5C:
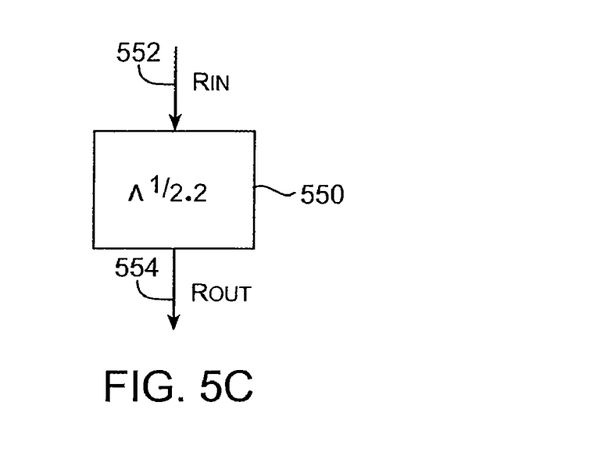
FIG. 5C illustrates a block diagram of a circuit that may be used to convert gamma-corrected values to linear values consistent with embodiments of the present invention.

In other embodiments, the conversion may be done in hardware. FIG. 5C illustrates a block diagram 550 of a circuit that may be used to convert gamma-corrected values received on line 552 to linear values on line 554. This may alternately be a dedicated special hardware instruction or power instruction.

In other embodiments of the present invention, a combination of the above may be implemented. For example, a look-up table may use a combination of software and dedicated look-up hardware. Alternately, software that uses more general hardware can be used.

Figure 6:
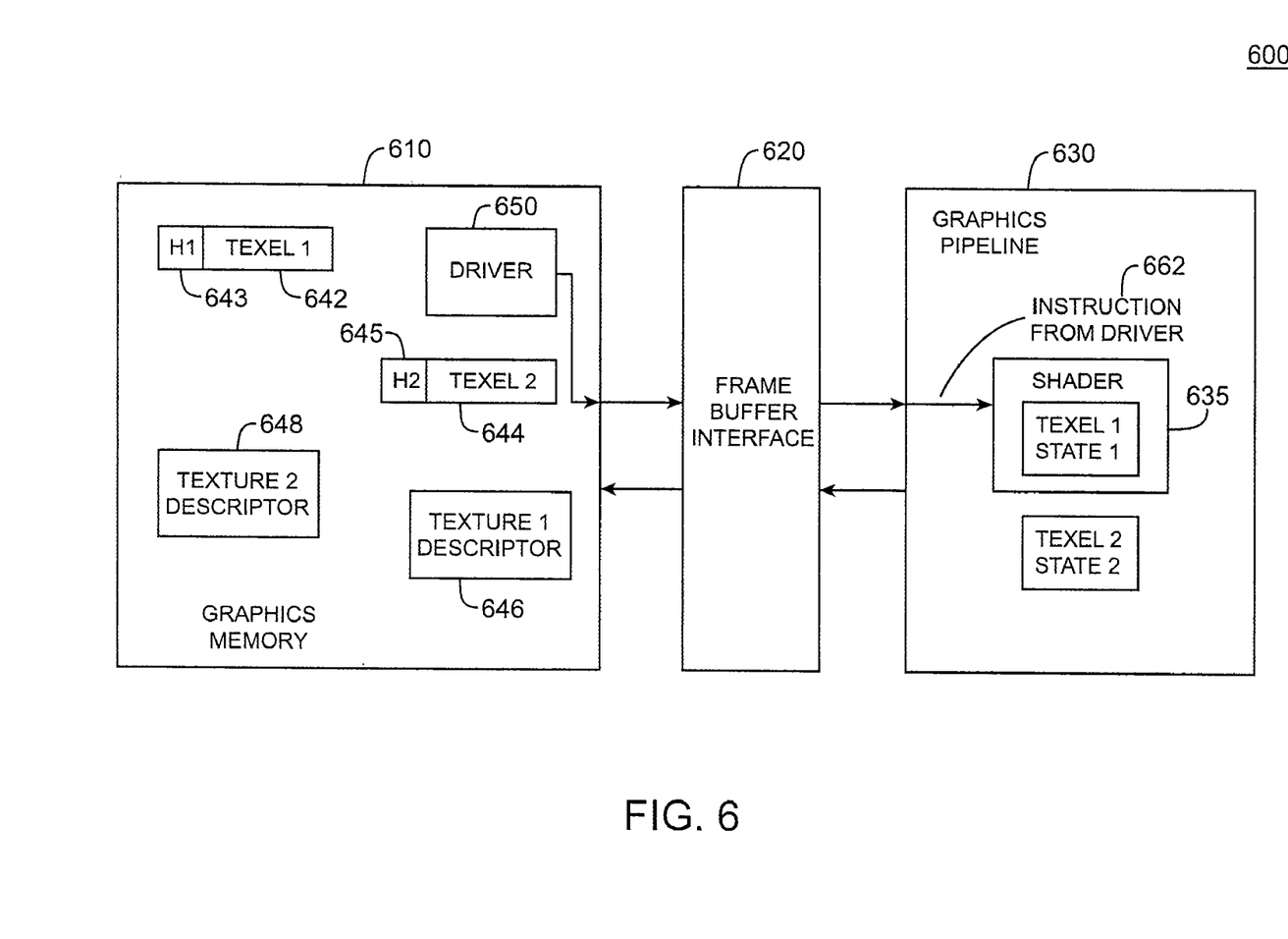
FIG. 6 illustrates a few ways that may be used to identify gamma-corrected texels.

In various embodiments of the present invention, it is desirable to keep track of which texels are gamma corrected. FIG. 6 illustrates a few of the different ways that may be used to identify gamma-corrected texels. In various embodiments, one or more of these may be used. Alternately, in other embodiments, other methods of identifying gamma-corrected texels may be used.

FIG. 6 is a block diagram of a system 600 including a graphics memory 610, frame buffer interface 620, and graphics pipeline 630. Stored in the graphics memory 610 are a first texel 642, second texel 644, first texture descriptor 646, and second texture descriptor 648. A driver 650 may also be stored in the graphics memory 610 or elsewhere. Frame buffer interface 620 provides these texels, texel descriptors, and instructions from the driver 650 to the graphics pipeline 630. The graphics pipeline 630 includes a shader 635, as well as other circuitry not explicitly shown.

In some embodiments of the present invention, the first texel 642 and second texel 644 include headers 643 and 645. These headers may include flags or other indicator values identifying whether a textile has been gamma corrected. These flags may be one or more bits in length. In other embodiments, the texture descriptors 646 and 648 may include one or more bits indicating whether the texels have been gamma corrected.

In some embodiments of the present invention, a shader program is written without the knowledge of whether the texture is gamma corrected, though the driver software has this information. In these situations, the driver 650 in the graphics memory 610, or other location, inserts instructions 662 into the shader program. Alternately, the shader program itself may track this information. Alternately, this information may be one or more bits in the pipeline state.

Figure 7:
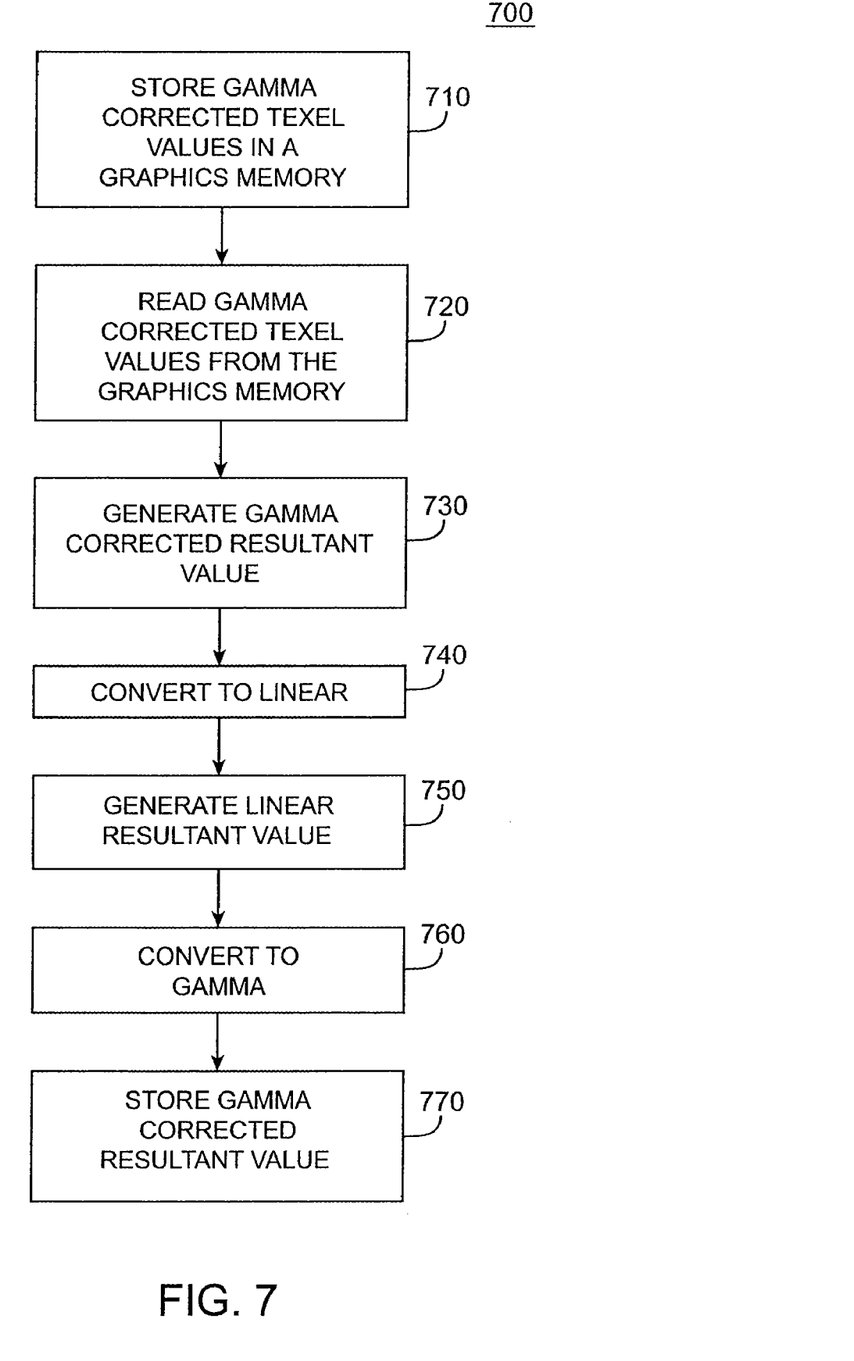
FIG. 7 is a flowchart illustrating a method of processing gamma-corrected texels according to an embodiment of the present invention.

FIG. 7 is a flowchart 700 showing a method of processing gamma-corrected texels according to an embodiment of the present invention. In act 710, gamma-corrected texel values are stored in a graphics memory. The gamma-corrected texel values are read from the memory in act 720. In optional act 730, these gamma-corrected texel values are used to generate a gamma-corrected resultant value. For example, the gamma-corrected texel values may be filtered, used by the shader, processed by the ROP, or processed by another processing circuit. In act 740, the gamma-corrected resultant value is converted to linear space. This linear output is used to generate a linear resultant value in act 750. For example, the ROP may operate in linear space, and generate linear resultant values, or other processing circuits may be used. In act 716, the linear resultant value is gamma corrected, and stored in the graphics memory in act 770.

Figure 8:
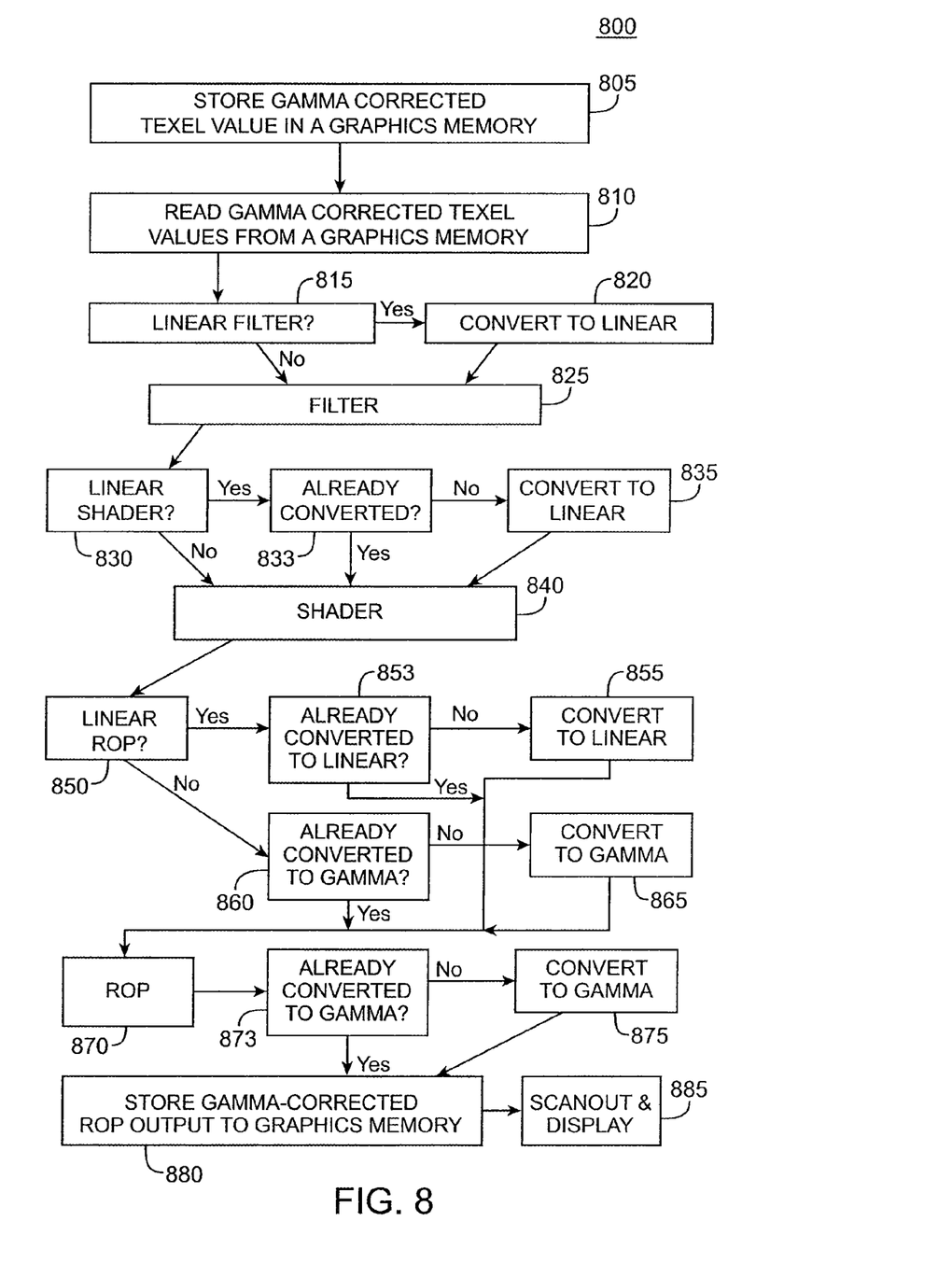
FIG. 8 is another flowchart illustrating a method of processing gamma-corrected texels according to an embodiment of the present invention.

FIG. 8 is a flowchart 800 showing a method of processing gamma-corrected texels according to an embodiment of the present invention. In act 805, gamma corrected texel values are stored in a graphics memory. These values are read from the graphics memory in act 810. If the texel filter is linear, the read texels are converted to linear space in a act 810, and provided to the filter in act 825. If the filter can process gamma-corrected texels, the gamma corrected texels are provided directly to the filter.

If the shader operates in linear space, the output of the filter is converted to linear, if required, in act 835, otherwise it is provided directly to the shader in act 833. If the shader operates on gamma-corrected outputs from the filter, those outputs are provided to the shader directly in act 830.

In act 850, it is determined whether the ROP operates in linear space. If it does, its input is converted to linear space in act 855, if required, otherwise the input provided directly to the ROP in act 853. Conversely, if the ROP is operates on gamma-corrected values, its input is converted to gamma-corrected values in act 865, if required, otherwise directly provided to the ROP in act 870. If the output of the ROP is gamma corrected, they are stored in memory in act 880, and scanned out and displayed in act 885. If it is required, the output of the ROP is converted to gamma-corrected values in act 875. These values are stored in graphics memory in act 880, and scanned out and displayed in act 885. It will be appreciated by one skilled in the art that other variations of this method are possible consistent with the present invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of processing gamma-corrected texels comprising:
   storing gamma-corrected texels in a graphics memory;
   reading the gamma-corrected texels from the graphics memory into a graphics processor;
   converting the gamma-corrected texels to linear texels in the graphics processor;
   generating a linear resultant value using the linear texels and a program running in the graphics processor;
   gamma correcting the linear resultant value to form a gamma-corrected resultant value;
   storing the gamma-corrected resultant value in the graphics memory; and
   reading the stored gamma-corrected resultant value from the graphics memory to use as a texel in the graphics processor.

2. The method of claim 1 wherein the gamma correcting is performed before raster operations.

3. The method of claim 1 wherein the gamma correcting is performed after raster operations.

4. The method of claim 1 wherein the linear texels are not stored in the graphics memory.

5. The method of claim 1 wherein the converting is done using a look-up table.

6. The method of claim 1 wherein the converting is done using a software instruction executed in the graphics processor.

7. A method of processing gamma-corrected texels comprising:
   storing gamma-corrected texels in a graphics memory;
   reading the gamma-corrected texels from the graphics memory into a graphics processor;
   filtering the gamma-corrected texels using a texture filter;
   converting the filtered gamma-corrected texels to linear texels in the graphics processor;
   generating a linear resultant value using the linear texels and a program running in the graphics processor; and
   gamma correcting the linear resultant value to form a gamma-corrected resultant value, wherein each texel stored in the graphics memory is associated with an indicator value indicating whether the texel has been gamma corrected.

8. The method of claim 7 wherein the gamma correcting is performed before raster operations.

9. The method of claim 7 wherein the gamma correcting is performed after raster operations.

10. The method of claim 7 wherein the converting is done using a look-up table.

11. The method of claim 7 wherein the converting is done using a software instruction executed in the graphics processor.

12. A method of processing gamma-corrected texels comprising:
storing gamma-corrected texels in a graphics memory;
reading the gamma-corrected texels from the graphics memory into a graphics processor;
converting the gamma-corrected texels to linear texels in a the graphics processor;
filtering the linear texels using a texture filter;
generating a linear resultant value using the filtered linear texels and a program running in the graphics processor; and
gamma correcting the linear resultant value to form a gamma-corrected resultant value,
wherein each texel stored in the graphics memory is associated with an indicator value indicating whether the texel has been gamma corrected.

13. The method of claim 12 wherein the gamma correcting is performed before raster operations.

14. The method of claim 12 wherein the gamma correcting is performed by an instruction in the program.

15. The method of claim 12 wherein the gamma correcting is performed after raster operations.

16. The method of claim 12 wherein the converting is performed using a look-up table.

17. The method of claim 12 wherein the converting is performed using a software instruction executed in the graphics processor.

18. The method of claim 12 wherein the converting is conditionally skipped if a read texel is not gamma corrected.

19. The method of claim 12 wherein the program comprise a software instruction, and the software instruction is a gamma-to-linear conversion instruction.

20. The method of claim 19 wherein the instruction is inserted into the program by driver software.

21. The method of claim 12 wherein the program performs a gamma-to-linear conversion on texels from a first texture and does not perform gamma-to-linear conversion on texels from a second texture.

22. The method of claim 12 wherein the indicator value is used by a branch instruction in the program.

23. The method of claim 12 wherein the indicator value is stored in the graphics memory and is associated with an entire texture.

24. The method of claim 12 wherein the indicator value is part of state information input to the graphics processor from driver software.

25. A graphics processor comprising:
a frame buffer interface configured to read and write gamma-corrected texels and gamma-corrected resultant values to a graphics memory;
a texel filter configured to receive gamma-corrected texels from the frame buffer interface;
a shader configured to receive filtered texels from the texel filter; and
a raster operations circuit configured to receive an output from the shader and provide gamma-corrected resultant values to the frame buffer interface,
wherein the texel filter is further configured to convert gamma-corrected filtered texels to linear filtered texels, and the shader is further configured to gamma correct its output.

26. A graphics processor comprising:
a frame buffer interface configured to read and write gamma-corrected texels and gamma-corrected resultant values to a graphics memory;
a texel filter configured to receive gamma-corrected texels from the frame buffer interface;
a shader configured to receive filtered texels from the texel filter; and
a raster operations circuit configured to receive an output from the shader and provide gamma-corrected resultant values to the frame buffer interface,
wherein the texel filter is further configured to convert gamma-corrected texels to linear texels before filtering, and the shader is further configured to gamma correct its output.

27. A graphics processor comprising:
a frame buffer interface configured to read and write gamma-corrected texels and gamma-corrected resultant values to a graphics memory;
a texel filter configured to receive gamma-corrected texels from the frame buffer interface;
a shader configured to receive filtered texels from the texel filter; and
a raster operations circuit configured to receive an output from the shader and provide gamma-corrected resultant values to the frame buffer interface,
wherein the shader is further configured to convert its output from gamma-corrected values to linear values and the raster operations circuit is further configured to gamma-correct its output.

28. A graphics processor comprising:
a memory interface;
a first processing circuit coupled to the memory interface;
a second processing circuit coupled to the first processing circuit; and
a third processing circuit coupled to the second processing circuit and the memory interface,
wherein the first processing circuit receives gamma-corrected texels from the interface and provides first linear resultant values to the second processing circuit,
the second processing circuit receives first linear resultant values from the first processing circuit and provides gamma-corrected second resultant values to the third processing circuit, and
the third processing circuit receives gamma corrected second resultant values from the second processing circuit and provides gamma corrected third resultant values to the memory interface.

29. The graphics processor of claim 28 wherein the first processing circuit comprises a texture filter, the second processing circuit comprises a shader, and the third processing circuit comprises a raster operations circuit.

30. The graphics processor of claim 28 wherein the first processing circuit comprises a gamma-to-linear converter, the second processing circuit comprises a texture filter and a shader, and the third processing circuit comprises a raster operations circuit.

31. The graphics processor of claim 28 wherein the first processing circuit comprises a texture filter and a shader, the second processing circuit comprises a raster operations circuit, and the third processing circuit comprises a linear-to-gamma converter.

32. A method of processing gamma-corrected texels comprising:

storing gamma-corrected texels in a graphics memory;

reading the gamma-corrected texels from the graphics memory into a graphics processor;

filtering the gamma-corrected texels;

converting the filtered gamma-corrected texels to linear texels in the graphics processor; and using the linear texels to generate shaded fragments, wherein each texel stored in the graphics memory is associated with an indicator value indicating whether the texel has been gamma corrected.

\* \* \* \* \*